UNITED STATES PATENT OFFICE

GEORGE EMERSON ARMSTRONG, OF NEW YORK, N. Y.

COMPOUND OF ROSIN.

SPECIFICATION forming part of Letters Patent No. 462,229, dated November 3, 1891.

Application filed October 16, 1890. Serial No. 368,334. (Specimens.)

*To all whom it may concern:*

Be it known that I, GEORGE EMERSON ARMSTRONG, a subject of the Queen of Great Britain, and residing at New York, in the county of New York and State of New York, have invented a new and useful Compound of Rosin, which I have found to be highly advantageous in the manufacture and subsequent treatment of fiber, yarns, and textiles, of which the following is a specification.

I proceed now to describe my new compound. I heat cocoanut-oil with a suitable quantity of caustic-soda lye of specific gravity 1.16, (20° Baumé.) In this saponaceous mass the glycerine may be removed by adding sodium chloride to salt out in the ordinary way; or the glycerine may be allowed to remain in the soap. The saponaceous mass is allowed to cool, cut in slices, thoroughly air-dried, and pulverized. The soap-powder is then mixed with sodium carbonate (dry) or soda-ash and rosin in the following proportions: sodium carbonate, (dry,) such as commercial soda-ash, 41.5; dry soap-powder, (ground,) 33.5, rosin, 25. The order of mixing the ingredients is immaterial. I adopt the one mentioned as most convenient. Of course any known chemical equivalent or equivalents may be substituted therefor. The above proportions are those which I find best adapted to the purpose; but such proportions may of course be varied to some extent. For instance, when I wish to prevent further shrinkage of the material to which I apply my compound, I increase very much the proportions of rosin. For different purposes the proportion may be varied. For instance, when I wish to prevent further shrinkage of the material I increase very much the proportion of the rosin. I make a good solution by mixing from six to ten ounces of the above with a gallon of water. It will be understood, too, that other ingredients may be added to the above mixture to give to it special qualities without departing from my invention, provided, however, that no ingredient be added which will render the rosin insoluble in water. For instance, by adding a little borax a fine gloss will be given the material.

My invention may be used in the manufacture and subsequent treatment of fibrous material, and will lessen the expense of and time employed in such manufacture and subsequent treatment; but the process of such manufacture and subsequent treatment is made the subject of another application for patent, filed April 4, 1890, Serial No. 346,592.

My new compound may be applied to textiles of different natures—such, for instance, as those made from flax and those made from cotton; and I have discovered that while the effects produced upon the material are in many cases the same, yet the action of the compound is different. For example, in applying my compound to material made from flax I have found that the injurious effects of certain gummy matter were nullified and that the material was in other ways purified, and the subsequent bleaching and finishing of it accelerated, while in applying my compound to material made from cotton which is manufactured from the bale and not the stem of the plant somewhat of the same results are effected. It is also made stronger and more elastic, and softer and more silky in appearance, will take dyes more readily, and is better adapted to be printed upon, as the pattern is less apt to run, is more clearly defined, and shows more distinctly on the reverse side. I do not wish to be understood, however, that it is only when applied to textiles that such results are obtainable, or that the results described as obtained on cotton cloth are exclusive of those obtainable on linen, and vice versa.

The solution may be applied at any point in the manufacture of the fiber, yarn, or fabric, or in the subsequent treatment thereof.

All of the effects enumerated above are produced by the application of a solution of my compound to a degree of excellence never known in the art before. They are set forth only by way of illustration. The material is rendered in many ways more valuable, both by giving it qualities it did not possess before and by making better those already there.

In the preparation of thread for weaving it is also useful. The manufacture of lace has been unsuccessful in this country because the thread breaks easily, and when being woven kinks, so that at best the product is only second grade. By the application of my solution the thread is strengthened and rendered pliable and elastic and more easily woven. With thread with which heretofore only second-grade curtains could be produced, by the application of a solution of my compound the finest curtains can be produced, and at less expense. I have discovered, too, that as a household article for washing, cleaning, &c., my compound is useful. For instance, in washing bed-linen, if a solution of my compound is used the disagreeable coldness of the linen is done away with. It will not be necessary to use a warming-pan. It will be like cotton in this respect.

What I claim, and desire to secure by Letters Patent, is—

The new composition of matter, which consists of a mechanical mixture of rosin, vegetable-oil soap, and a carbonate of an alkali, substantially as described.

In testimony whereof I affix my signature, in presence of two witnesses, this 14th day of October, 1890.

GEORGE EMERSON ARMSTRONG.

Witnesses:
  GEORGE W. SHORT, Jr.,
  H. Y. N. PHILIP.